United States Patent [19]

Hoff

[11] Patent Number: 5,333,704
[45] Date of Patent: Aug. 2, 1994

[54] ROTATING LUBRICATING TECHNIQUE FOR EQUIPMENT

[76] Inventor: John Hoff, 10661 South Hoff La., Idaho Falls, Id. 83406

[21] Appl. No.: 41,697

[22] Filed: Apr. 1, 1993

[51] Int. Cl.$^5$ ............................................. F16N 7/16
[52] U.S. Cl. ................................ 184/11.4; 184/11.1; 184/15.1; 184/15.3; 474/91
[58] Field of Search ...................... 189/7.4, 11.1, 11.2, 189/11.4, 11.5, 15.1, 15.3, 65; 239/747; 474/91

[56] References Cited

U.S. PATENT DOCUMENTS

| | | |
|---|---|---|
| 192,160 | 6/1877 | Foster . |
| 467,595 | 1/1892 | Myers . |
| 473,755 | 4/1892 | Ives . |
| 513,506 | 1/1894 | Hill . |
| 579,385 | 3/1897 | Dodge . |
| 787,654 | 4/1905 | Allmond . |
| 1,771,835 | 7/1930 | Bartlett . |
| 1,783,978 | 12/1930 | Perry . |
| 2,655,222 | 10/1953 | Warwick . |
| 3,393,499 | 7/1968 | Harer et al. ........................ 184/15.1 |
| 3,473,644 | 10/1969 | Hagerborg ............................ 474/91 |
| 3,762,643 | 10/1973 | Allen, Jr. . |
| 3,915,252 | 10/1975 | Datta et al. ........................... 474/91 |
| 4,305,627 | 12/1981 | Yargici ................................ 184/11.2 |

FOREIGN PATENT DOCUMENTS 1229346 11/1966 Fed. Rep. of Germany .
1460521 2/1989 U.S.S.R. ................................ 184/7.5

OTHER PUBLICATIONS

Color photocopy of a photograph of a lubrication device used on an irrigation line. The lubrication device is believed to have been used publicly prior to Apr. 1, 1992.

Primary Examiner—Thomas E. Denion
Attorney, Agent, or Firm—John R. Ley; John B. Phillips

[57] ABSTRACT

Lubricant is applied to a lubrication point by moving an emitter in a first portion of a movement path through lubricant in a reservoir and then moving the emitter through a second portion of the movement path. The emitter is loaded with lubricant in the first portion of the movement path and is drained from a drain port during the second portion of the movement path. The lubricant drained from the emitter is distributed to the lubrication point. A distribution device may be positioned below the emitter to collect the lubricant drained from the emitter and to distribute the collected lubricant to a lubrication point or position other than a position below the emitter during the second portion of the movement path.

25 Claims, 8 Drawing Sheets

Fig_1

Fig_2

Fig_9

Fig_10c

Fig_10a

Fig_10d

Fig_10b

Fig_10e

Fig_17

Fig_18

Fig_19

ROTATING LUBRICATING TECHNIQUE FOR EQUIPMENT

This invention relates to the lubrication of moving machinery, and more particularly, to a new and improved lubrication device to be attached to a rotating component of the machinery, and to a new and improved method of applying lubrication, to allow rotation of a lubrication emitter to load the emitter with lubricant during one part of its rotation and to deliver the lubricant during another part of its rotation.

BACKGROUND OF THE INVENTION

Machines having at least one rotating component are frequently used in a variety of situations, such as industry, farming, and construction. Such machinery is typically operated outdoors and often may be too large to be stored indoors during periods of nonuse. Machinery used outdoors is exposed to a wide variety of weather and environmental conditions such as precipitation, wind, dirt and temperature extremes. Due to the exposure in difficult conditions, continual lubrication of moving parts may be required to maintain the equipment in proper operating condition.

A self-propelled irrigation system used on a farm is an example of machinery which is subject to these concerns. Some self-propelled irrigation systems use chain drives for rotating the wheels which propel these systems. The chains, sprockets and other rotating drive elements of the propulsion power transmission are constantly exposed to the ambient environmental conditions and to water from the irrigation system. Without constantly reapplying lubricant to the chains, the lubricant is quickly washed off and the chains fail, disabling the whole irrigation system.

In these situations, lubrication is typically applied manually at intervals which, in many cases, are irregular. Significant time may be required to lubricate the moving parts of the irrigation systems, and to maintain the parts lubricated under the difficult conditions of constant exposure to water. Even the most thorough and repeated manual lubrication effort is sometimes inadequate to prevent failure of the chains. Similar problems exist with other types of equipment having moving parts which are exposed to constant difficult environmental and use conditions.

Attempts have been made to continuously lubricate machinery drive elements by placing the drive elements in a rigid enclosure and filling the enclosure with a reservoir of lubricant in contact with the drive elements. See, for example, U.S. Pat. No. 3,762,643, entitled "Irrigating Apparatus," illustrating a rigid enclosure surrounding a power transmission of a self-propelled irrigating apparatus. While such an arrangement accomplishes the purpose of continuous lubrication, such a lubrication system is typically an integral part of an entire irrigation apparatus and thus cannot be easily added to existing machinery. Furthermore, many types of machinery utilize extensive drive devices, such as large sprocket wheels or long drive chains, which could not be feasibly enclosed within a lubricant reservoir.

It is with regard to this background information that the improvements available from the present invention have evolved.

SUMMARY OF THE INVENTION

One of the significant aspects of the present invention is a lubrication device for applying lubricant to a lubrication point of a machine having a rotating component. The lubrication device includes a reservoir having an internal volume to contain lubricant and an emitter having an internal volume of a predetermined size substantially smaller than the internal volume of the reservoir. The emitter has an inlet through which lubricant enters the internal volume of the emitter and a drain port to allow the lubricant to drain from the emitter. The emitter is moved in a first portion of a movement path into fluid communication with the lubricant in the reservoir and is moved in a second portion of the movement path out of fluid communication with the lubricant in the reservoir. An inlet of the emitter allows the lubricant to enter the emitter only during the first portion of the movement path and prevents lubricant from draining from the emitter during the second portion of the movement path. A drain port of the emitter allows the lubricant within the emitter to drain from the emitter substantially only during the second portion of the movement path and inhibiting lubricant from draining from the emitter during the first portion of the movement path. The lubricant draining from the emitter during the second portion of the movement path is delivered to the lubrication point. The reservoir may rotate with the emitter, in which case an internal lubricant delivery receptacle is loaded with lubricant during rotation and supplies the lubricant to the emitter. The reservoir may also be stationary, in which case the emitter moves within the reservoir and through the lubricant in the reservoir.

Another of the significant aspects of the present invention is a method of applying lubricant to a lubrication point. The method involves steps including containing lubricant within a reservoir, and rotating an emitter in a circular movement path through the lubricant in the reservoir. The emitter has an internal volume of a predetermined size substantially smaller than the internal volume of the reservoir, an inlet through which lubricant enters the internal volume of the emitter and a drain port to allow the lubricant to drain from the emitter. The circular movement path has a first portion and a second portion, and the method further includes flowing lubricant from the reservoir into the emitter through the inlet while the emitter is in the first portion of the circular movement path, draining lubricant from the internal volume of the emitter through the drain port while the emitter is in the second portion of the circular movement path, and delivering the lubricant drained from the emitter to the lubrication point.

In the case of either the lubrication device or the lubricating method, a distribution device may be positioned below the emitter during the second portion of the movement path to collect the lubricant drained from the emitter and to distribute the collected lubricant to a lubrication point or position other than a position below the emitter during the second portion of the movement path.

The rotation of the emitter allows a predetermined amount of lubricant to be obtained and delivered with each rotation of the emitter, regardless of the direction of rotation of the emitter. By linking the rotation of the emitter to the operation of the equipment, the lubricant is continually applied during operation of the equipment. The amount of lubricant delivered is controlled by the size of the internal volume of the emitter, the size of the inlet, and the size of the drain port. Furthermore, the lubrication may be distributed to a variety of different points on the equipment. Should the operation of the equipment stop when the emitter is in the first portion of the movement path, all of the lubricant in the reservoir will not drain out.

A more complete appreciation of the present invention and its scope can be obtained from understanding the accompanying drawings, which are briefly summarized below, the following detailed description of a presently preferred embodiment of the invention, and the appended claims.

DETAILED DESCRIPTION OF PREFERRED EMBODIMENTS

Figure 1:
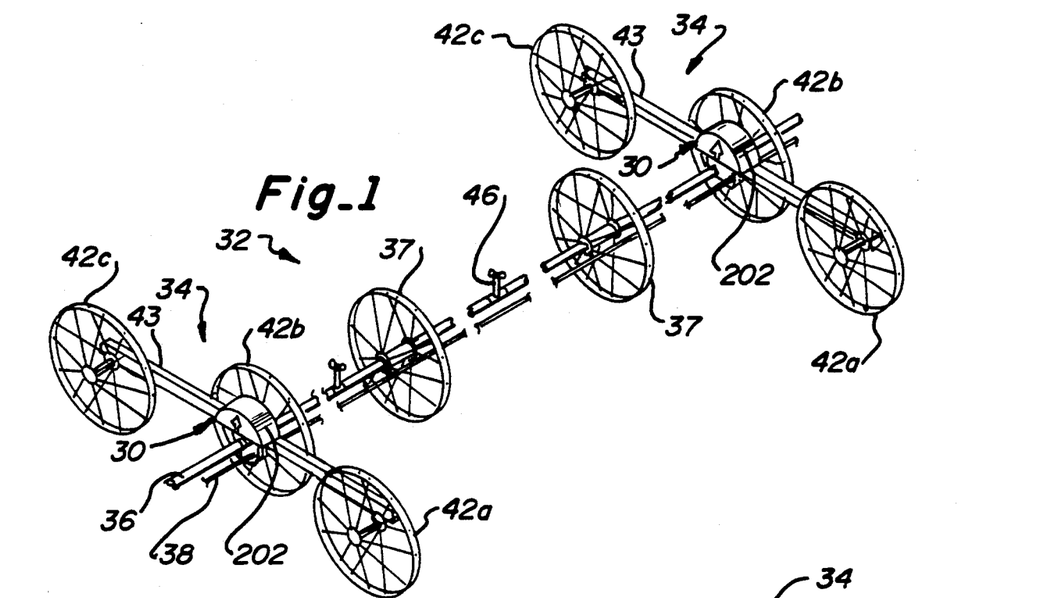
FIG. 1 is a generalized partial perspective view of a self-propelled irrigation system to which a lubrication device incorporating the present invention is attached.
Figure 2:
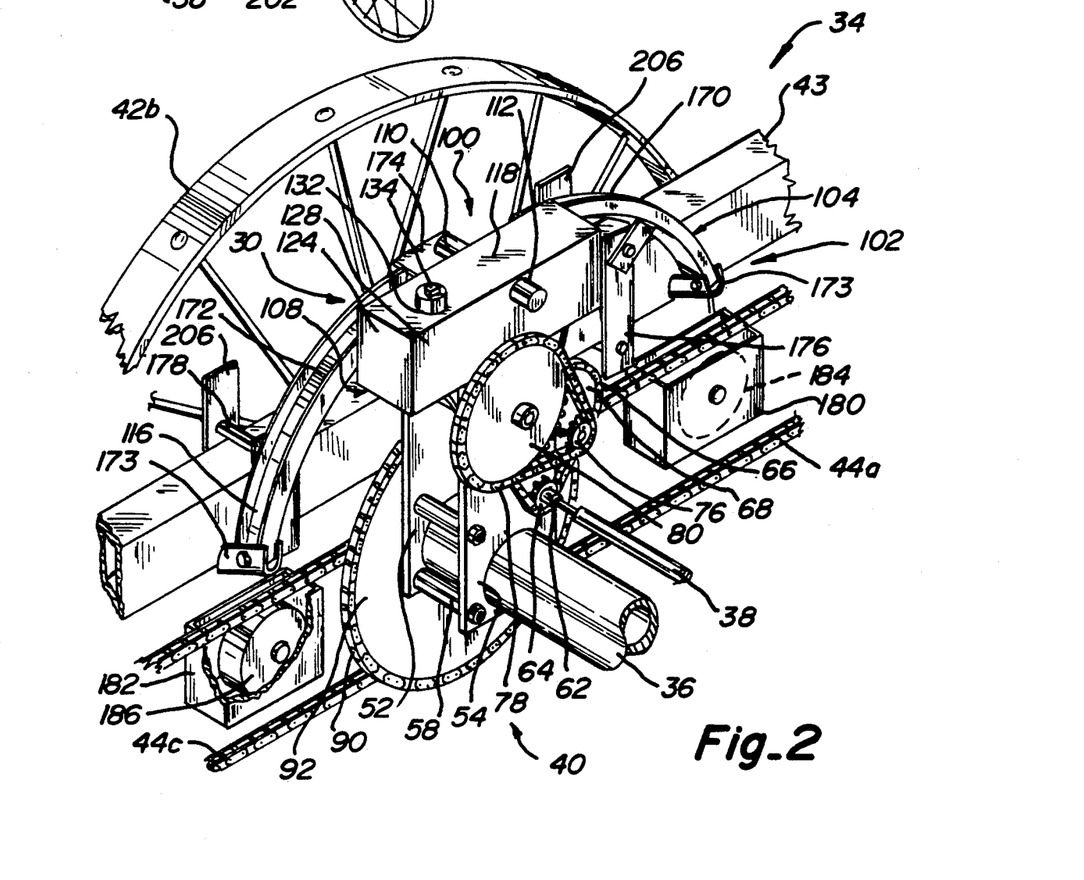
FIG. 2 is a perspective view of one embodiment of the lubrication device used in conjunction the irrigation system shown in FIG. 1.

One embodiment of a lubrication device 30 which incorporates the present invention is shown in FIGS. 1 and 2. The lubrication device 30 is attached to a self-propelled irrigation system 32, as shown in FIG. 1. The irrigation system 32 includes multiple individual drive sections 34 to support and motivate a water conduit 36. The drive sections 34 are stationed approximately every 600 feet along the conduit. The water conduit 36 is made up of individual pipe segments approximately 40 feet in length, and is supported between the drive sections 34 by independent support wheels 37 positioned at the pipe segment junctures.

The drive sections 34 are interconnected by long drive shafts 38 which may be rotated in either direction by a motor (not shown) at one end of the system 32. The drive shafts 38 operate a power transmission 40 (FIG. 2) on each drive section 34. The power transmission 40 operatively rotates forward, middle and rear wheels (42a, 42b and 42c, respectively) which are rotatably attached to a horizontal beam 43 of each drive section 34. The middle wheel 42b is driven by the power transmission 40, and the front and rear wheels 42a and 42c are driven by drive chains 44a and 44c, respectively, which connect to sprockets attached to the wheels 42a, 42b and 42c. The wheels and drive chains are collectively referred to hereafter by the reference numerals 42 and 44, respectively. In some irrigation systems, individual electrical motors may supply mechanical power to the power transmission 40 of each drive section 34 in lieu of a single motor powering a series of drive shafts 38.

The rotation of the wheels 42 moves the water conduit 36 along a predetermined path of irrigation. A flexible hose (not shown) attached to the end of the system 32 supplies pressurized water to the water conduit 36 when the system is stationary. Sprinklers 46 connected to the conduit 36 thus irrigate the land while the system 32 is stationary. The water within the conduit 36 is drained at the conclusion of the irrigation cycle to allow the system 32 to be more easily moved to the next irrigation location. Once the sprinklers 46 have rotated atop the water conduit 36 at the new irrigation site, movement of the system 32 is stopped for the commencement of a new irrigation cycle.

As is apparent, the power transmission 40 and the drive chains 44 are exposed to the ambient environmental conditions, which are exacerbated by the continued presence of water delivered from the sprinklers 46. Without repeated lubrication of these elements, the drive chains 44 and elements of the power transmission 40 will fail as a result of wear occurring under conditions of inadequate or non-existent lubrication, More details regarding the power transmission 40 are shown in FIGS. 2 to 5. The elements of the power transmission 40 are operatively connected to and supported by an inner mounting plate 52 which is closest to the wheel 42b, and a outer mounting plate 54, both of which are fixedly attached to, and rotate in unison with, the water conduit 36 to which the center wheel 42b is attached. Spacers 58 maintain the relative alignment and spacing of the mounting plates 52 and 54.

Rotational power from the motor is applied through the drive shaft 38 to an input shaft 62 which is rotatably supported by the mounting plates 52 and 54. The input shaft 62 is attached to another drive shaft 38 on the opposite side of the mounting plates 52 and 54 to transfer rotational power from the motor to another power transmission 40 on an adjacent drive section 34. A first small sprocket 64 is attached to the input shaft 62 adjacent the outer mounting plate 54. Upon rotation of the input shaft 62, the first small sprocket 64 turns a first chain 66 which extends around a first large sprocket 68. The size differential of the sprockets 64 and 68 achieves a first stage of speed reduction and torque increase in the power transmission 40. The first large sprocket 68 is attached to a shaft 70 which is rotatably supported within a hollow sleeve 72 by a bearing 74. The hollow sleeve 72 is fixedly attached to and extends between the mounting plates 52 and 54.

A second small sprocket 76 is attached to the shaft 70 to rotate in unison with the first large sprocket 68. The second small sprocket 76 turns a second chain 78 which extends around a second large sprocket 80. The size differential of the sprockets 76 and 80 achieves a second stage of speed reduction and torque increase in the power transmission 40. The second large sprocket 80 is attached to a shaft 82 which is rotatably supported within a hollow sleeve 84 by a bearing 86. The hollow sleeve 84 is fixedly attached to and extends between the mounting plates 52 and 54.

A third small sprocket 88 is attached to the shaft 82 adjacent the inner mounting plate 52. The third small sprocket 88 rotates in unison with the second large sprocket 80. The third small sprocket 88 turns a third chain 90 which extends around a third large sprocket 92. The size differential of the sprockets 88 and 92 achieves a third stage of speed reduction and torque increase in the power transmission 40. The third large sprocket 92 is fixedly attached to the water conduit 36 of the center wheel 42b. Thus, the triple speed reduction and torque increase performed by the three sets of small and large sprockets 64, 68; 76, 80 and 88, 92 rotates the center wheel 42b at a much reduced speed and with greater torque relative to the rotational speed and torque of the drive shaft 38.

Figures 3, 4, 5:
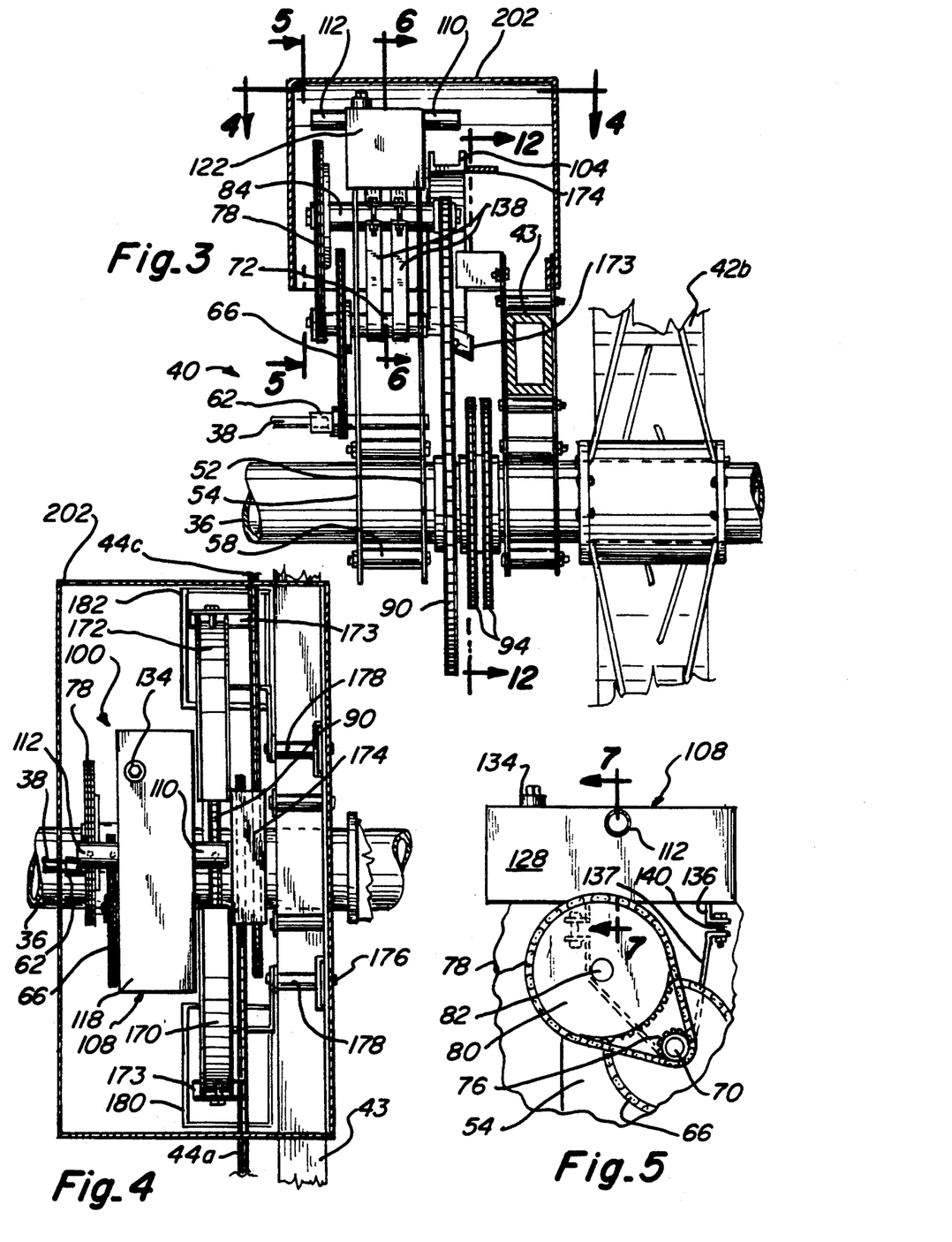
FIG. 3 is a side elevational view of the lubrication device and a portion of a wheel as shown in FIG. 2.
FIG. 4 is a section view of the lubrication device shown in FIG. 3, taken substantially in the plane of line 4—4 in FIG. 3.
FIG. 5 is a partial section view of the lubrication device shown in FIG. 3, taken substantially in the plane of line 5—5 in FIG. 3.

As is shown in FIG. 3, the mounting plates 52 and 54 are connected through the spacers 58 by bolts to the third large sprocket 92. In this manner, the power transmission 40, including all of its elements supported by the mounting plates 52 and 54, rotate in unison with the water conduit 36. The water conduit 36 is rotatably connected through a bearing (not shown) to the horizontal beam 43. A set 94 of drive sprockets is fixedly attached to the water conduit 36 between the third large sprocket 92 and the center wheel 42b to turn the drive chains 44 leading to the front and rear wheels 42a and 42c. The drive sprocket set 94 is identical in size to sprockets on the front and rear wheels 42a and 42c. Consequently, the front and rear wheels 42a and 42c rotate at the same speed as the center wheel 42b.

It is apparent from the previous description that each individual drive section 34 utilizes five chains (44a, 44c, 66, 78 and 90) to transmit power from the motor 38 to the wheels 42. The lubricating device 30 of the present invention is intended to lubricate all of these chains, as well as exposed ball bearings (not shown), during operation of the irrigation system 32.

The lubrication device 30 is best shown in FIG. 2. The lubrication device 30 of the present invention includes a lubricant reservoir and emitter assembly 100 connected in fixed relation to the mounting plates 52 and 54 and a lubrication distribution device 102, which in one form is a segmented trough 104 fixedly attached to the horizontal beam 43, as shown in FIG. 2. When the assembly 100 rotates with the water conduit 36 and wheel 42b into an inverted position (FIG. 10c), lubricant 106 within a reservoir 108 of the assembly 100 drains into and fills two emitters 110 and 112 (FIG. 11c) of the assembly 100. When the assembly 100 rotates toward an upright position (FIGS. 2 and 10a), the lubricant 106 within the emitters 110 and 112 drains from drain ports 114 formed in the emitters 110 and 112. The lubricant drains directly from the ports 114 onto the first, second and third chains, 66, 78 and 90 respectively, as well as the segmented trough 104. The lubricant dripped on the trough 104 drains to its ends where it is collected and directed through distribution channels 116 to the drive chains 44a and 44c.

The lubricant 106 is applied during each rotation of the wheel 42b and only when the assembly reaches a generally upright position above the chains. Furthermore, as will be explained in greater detail later, features of the reservoir and emitter assembly 100 prevent the continued escape of all of the lubricant 106 from within the reservoir 108 should the wheel 42b and the assembly 100 stop rotating in an inverted position. Further details of the lubrication device 30 are described as follows.

Figure 6:
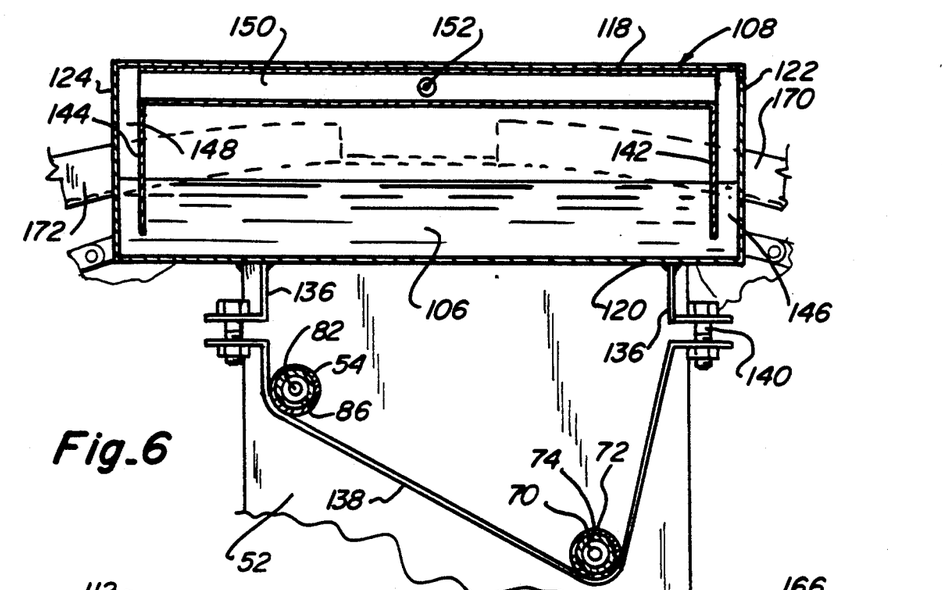
FIG. 6 is an enlarged, partial section view of the lubrication device shown in FIG. 3, taken substantially in the plane of line 6—6 in FIG. 3.
Figures 7, 8:
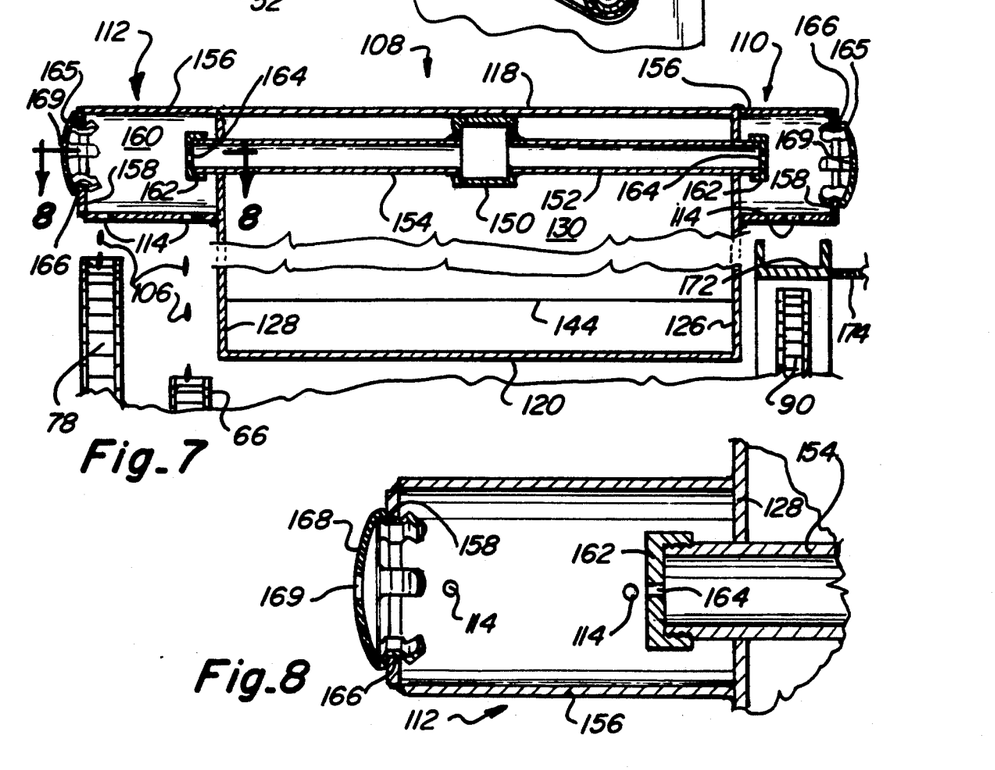
FIG. 7 is a section view of the lubrication device shown in FIG. 5, taken substantially in the plane of line 7—7 in FIG. 5.
FIG. 8 is a partial section view of the lubrication device shown in FIG. 7, taken substantially in the plane of line 8—8 in FIG. 7.
Figures 9, 10A, 10B, 10C, 10D, 10E:
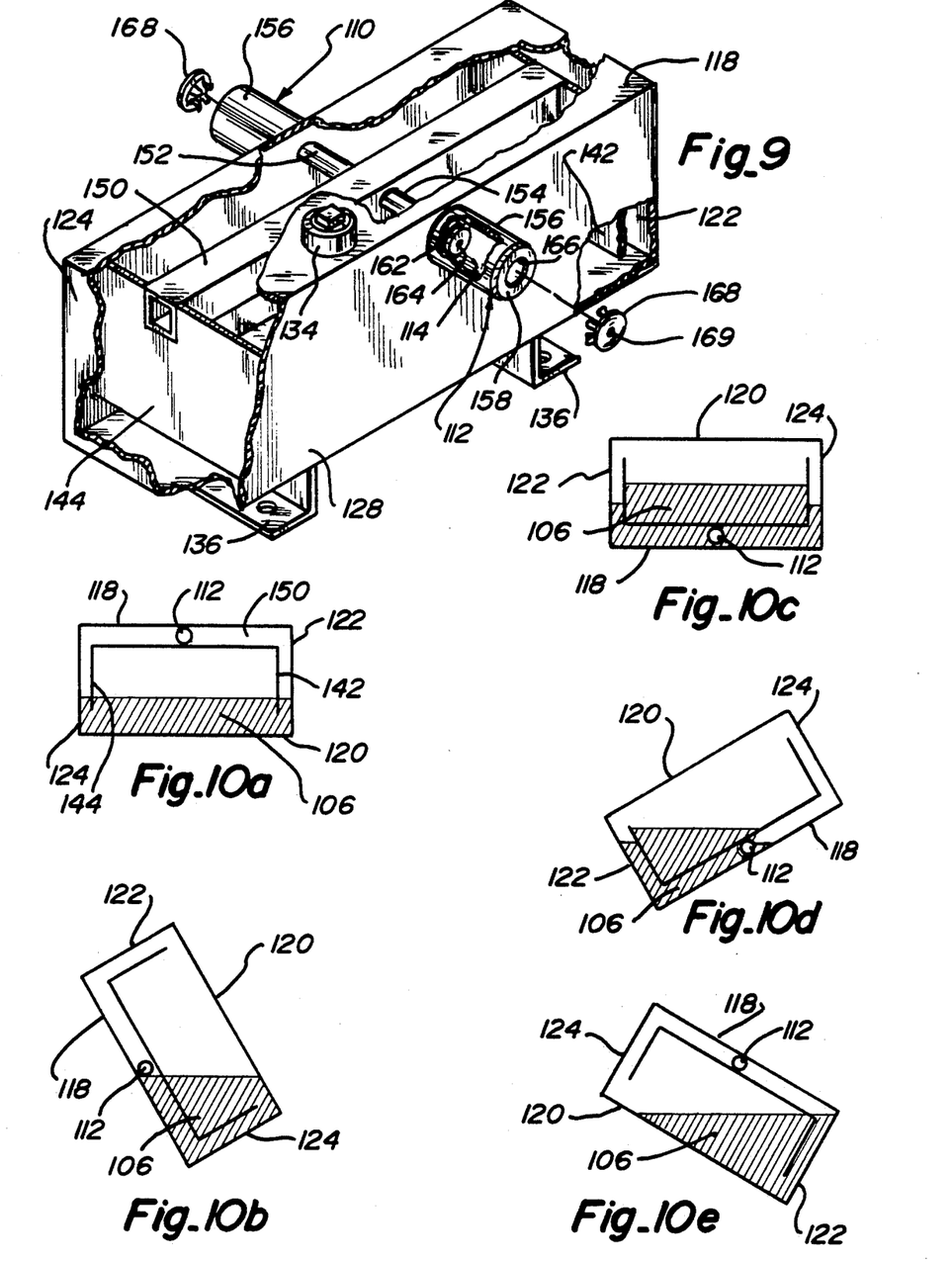
FIG. 9 is a perspective view, with certain portions broken out for clarity, illustrating the lubrication device shown in FIGS. 2–8.
FIGS. 10a, 10b, 10c, 10d and 10e are generalized side section views similar to that of FIG. 6, showing the condition of lubrication within a lubrication reservoir of the lubrication device shown in FIG. 2, at different locations of a complete rotation of the lubrication device.

The reservoir 108 may be of any shape but is preferably the prismatic shape shown in FIGS. 6, 7 and 9. A top wall 118, a bottom wall 120, a front end 122, a rear end 124, a left side 126 and a right side 128 define a rectangular prismatic interior volume 130. The reservoir 108 is preferably fabricated from metal sheet for ease of construction, but may be made of any suitable durable material. In the preferred embodiment, the walls 118 and 120, the ends 122 and 124 and sides 126 and 128 of the reservoir are welded together. A fill port 132 is formed in the top wall 118 to allow periodic refilling of the interior volume 130 with lubricant 106, and a fill plug 134 threadably engages the fill port 132 to seal the interior volume 130 of the reservoir 108.

Mounting flanges 136 are welded to the bottom wall 120 of the reservoir 108, as shown in FIGS. 6 and 9. A pair of irregular U-shaped mounting brackets 138 fit snugly about the sleeves 72 and 84 and attach to the mounting flanges 136 by connectors such as bolts 140. Tightening the bolts 140 pulls the bottom wall 120 down in contact with the upper ends of the mounting plates 52 and 54, as shown in FIG. 3. In this manner, the reservoir 108 is securely attached to the mounting plates 52 and 54 and to the sleeves 72 and 84 and rotates in unison with the power transmission 40 about the water conduit 36.

Within the interior volume 130 of the reservoir 108, two baffles 142 and 144 are positioned adjacent the front end 122 and the rear end 124, respectively, as shown in FIGS. 6, 7 and 9. The baffles 142 and 144 are preferably made of metal and are in the form of rectangular sheets welded to the top wall 118 and sides 126 and 128. The baffles 142 and 144 are preferably parallel to the adjacent ends 122 and 124 and extend from the top wall 118 toward the bottom wall 120, terminating at a location slightly above the bottom wall 120 as shown in FIGS. 6, 7 and 9. The baffles 142 and 144 create two end chambers 146 and 148 within the reservoir 108 at positions adjacent the ends 122 and 124, respectively.

A connecting conduit 150, which is preferably rectangular in cross section, is located adjacent to the top wall 118 within the internal volume 130 and extends between the baffles 142 and 144. The connecting conduit 150 extends through the baffles 142 and 144 and thereby establishes communication therethrough between the two end chambers 146 and 148, as is shown in FIGS. 6 and 9.

Feed pipes 152 and 154 extend transversely from each side of the connecting conduit 150 at a middle location between the baffles 142 and 144, as is shown in FIGS. 7 and 9. The feed pipes 152 and 154 extend from the connecting conduit 150 through the sides 126 and 128, respectively, to the exterior of the reservoir 108. The feed pipes 152 and 154 are sealed, preferably by welding, to the sides 126 and 128 to prevent leaks of lubricant 106 from the internal volume 130 at the locations where the feed pipes exit the reservoir 108. The exterior end of each feed pipe 152 and 154 extends into the interior of the emitters 110 and 112.

The emitters 110 and 112 may be of any shape but are preferably cylindrically shaped, as shown in FIGS. 7-9. A cylindrical wall 156, a circular end 158 and one of the sidewalls 126 or 128 (128 is shown FIG. 9 for emitter 112) define an internal emitter volume 160 that is relatively smaller than the internal volume 130 of the reservoir 108. The cylindrical wall 156 and the circular end 158 are preferably metallic and are welded together, while the opposite end of the cylindrical wall 156 is welded to the sides 126 and 128 of the reservoir 108, respectively, at a location where the cylindrical wall 156 surrounds the exterior end of the feed pipes 152 and 154.

The end chambers 146 and 148, the connecting conduit 150 and the feed pipes 152 and 154 form a lubricant delivery receptacle for obtaining lubricant 106 from within the internal volume 130 of the reservoir 108 and for delivering the lubricant contained in the lubricant delivery receptacle into the emitters 110 and 112. As is discussed below, each rotation of the reservoir and emitter assembly 100 results in the lubricant delivery receptacle obtaining an additional supply of lubricant from the reservoir 108 during one part of the rotation of the assembly 100 and in delivering the lubricant within the lubricant delivery receptacle during another part of the rotation of the assembly 100.

The drain ports 114 are formed through the cylindrical walls 156 at predetermined locations directly above the chains 66, 78 and 90 and the trough 104, to deliver the lubricant from within the emitters and allow it to fall by gravity onto the chains and trough. In addition, as is best understood from FIGS. 7 and 8, the drain ports 114 are oriented to generally face the bottom wall 120 of the reservoir. With this particular orientation, and as is better understood from the following description, the drain ports 114 do not drain lubricant from within the internal emitter volume 160 when the lubricant delivery receptacle loads lubricant into the emitters 110 and 112, but the drain ports do rotate into position to allow the lubricant to drain onto the chains and trough when the assembly 100 reaches the appropriate location near the top of its rotation.

An end cap 162 having a metering hole 164 formed therein is fixed to the exterior end of each feed pipe 152 and 154 within the internal volume 160 of each emitter 110 and 112, as is shown in FIGS. 7-9. The metering hole 164 has a smaller diameter than that of the feed pipes 152 and 154 to reduce the flow rate at which lubricant 106 is transferred through the feed pipes 152 and 154 into the internal volumes 160 of the emitters 110 and 112. Adjusting the size of the metering hole 164 controls the delivery rate of the lubricant into the interior of the emitters 110 and 112.

The circular end 158 of the emitters 110 and 112 contains a preferably circular hole 166. The hole 166 allows access to the emitter interior volume 160 and to the end cap 162 if it is desired to change the size of the metering hole 164 or replace the end cap 162, as is shown in FIG. 8. A spring steel snap plug 168 is press fit into the circular hole 166. The plug 168 contains a vent hole 169 which allows air to flow into and out of the interior emitter volume 160. This venting capability is important in allowing air to enter the emitters as lubricant 106 is delivered from the emitters, as is described below.

The manner of operation of the lubrication device 30, in which the lubricant delivery receptacle obtains a charge of lubricant 106 from within the reservoir 108 during one part of a rotation of the reservoir and emitter assembly 100, and the emitters 110 and 112 deliver the lubricant during another part of the rotation of the assembly 100, is described in conjunction with FIGS. 10a-10e and 11a-11e. During operation of the power transmission 40, the assembly 100 rotates about the water conduit 36 as has been previously described.

Figure 11A:
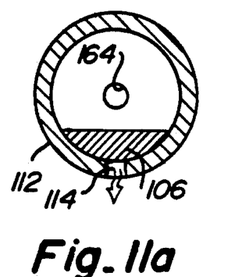
FIGS. 11a, 11b, 11c, 11d and 11e are generalized side section views of an emitter of the lubrication device shown in a different view in FIGS. 7 and 8, showing the condition of lubrication within the emitter at different locations of a complete rotation of the lubrication device. The conditions shown in FIGS. 11a, 11b, 11c, 11d and 11e generally correspond to the conditions shown in FIGS. 10a, 10b, 10c, 10d and 10e, respectively.
Figure 11B:
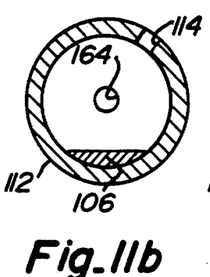

At the upright position of the assembly shown in FIG. 10a, the drain ports shown in FIG. 11a are pointed downward, thereby allowing the lubricant to drain from the emitters 110 and 112. As the assembly 100 rotates to the position shown in FIG. 10b, the baffle 142 scoops lubricant 106 from that available in the interior volume 130 into the end chamber 146 and into a portion of the connecting conduit 150. At this position, the drain ports 114 point upward as shown in FIG. 11b, to cause the lubricant to stop draining from the emitters. As a practical matter, most of the lubricant will have already drained from the emitters by this time.

As the assembly 110 continues to rotate into the position where the reservoir 108 is inverted as shown in FIG. 10c, the lubricant which has been scooped up fills the lubricant delivery receptacle formed by the end chambers 146 and 148, the connecting conduit 150 and the feed pipes 152 and 154. The lubricant contained within the lubricant delivery receptacle is segregated from the lubricant within the remainder of the internal volume 130 of the reservoir 108 by the baffles 142 and 144 and the closed connecting conduit 150. The lubricant within the lubricant delivery receptacle fills the connecting conduit and the feed pipes and flows into the emitters 110 and 112. Thus, the lubricant delivery receptacle segregates the emitters 110 and 112 from the lubricant remaining within the internal volume 130 of the reservoir. As lubricant drains from the lubricant delivery receptacle into the emitters, the level of lubricant within the receptacle drops below the level within the internal volume 130. This reduction in lubricant level constitutes a first stage reduction of the head pressure of the lubricant draining into the emitters.

Figure 11C:
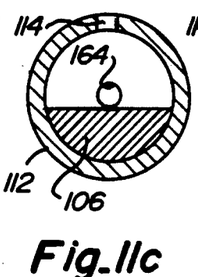
Figure 11D:
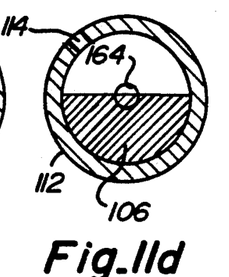

As is shown in FIG. 11c, the drain ports 114 in the emitters are oriented upward as the internal emitter volume 160 fills with lubricant from the lubricant delivery receptacle. Thus, the maximum lubricant level that may be contained within the emitters is established by the vent holes 169 within the snap plugs 168. However, the lubricant delivery receptacle prevents lubricant from draining out the vent holes 169 during normal operation of the assembly 100. In addition to the first stage reduction of head pressure provided by the lubricant delivery receptacle, the metering holes 164 (FIGS. 7-9) slow the flow of lubricant into the emitters. The relatively small metering holes typically prevent the internal volume 160 of the emitters from filling with lubricant during the normal rotational speed of the assembly 100. In this manner, the metering holes 164 act as a second stage reduction of the head pressure of the lubricant draining into the emitters.

Although the metering holes 164 control the rate at which the emitters are filled, lubricant will continue to flow into the emitters while the lubricant level within the lubricant delivery receptacle is greater than the lubricant level within the emitters. Should the irrigation system 32 stop operating when the assembly 100 is in an inverted position (FIGS. 10d and 11d), the lubricant will continue to flow into the emitters 110 and 112 and leak out the vent holes 169 until the lubricant level within the lubricant delivery receptacle drops to the level of the vent holes 169 (FIG. 10d). However, the lubricant remaining in the internal volume 130 of the reservoir 108 is segregated by the baffles 142 and 144, the connecting conduit 150 and the feed pipes 152 and 154 and thus will not leak out the emitter drain ports 114 regardless of the length of time the assembly 100 remains inverted. Thus, the segregated lubricant delivery reservoir prevents all of the lubricant within the reservoir from leaking out if the assembly 100 stops rotating in an inverted position. This significant feature allows the lubrication device 30 to be used under circumstances where rotation of the assembly 100 is sporadic or intermittent.

Figure 11E:
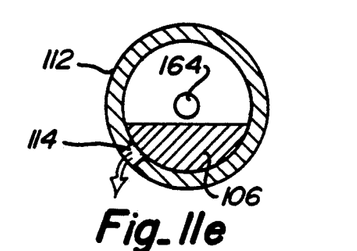

Rotation of the drain ports 114 below the level of lubricant within the emitters allows the lubricant to start draining from the ports 114 as is shown in FIG. 11e. At the rotational position shown in FIGS. 10e and 11e, the assembly 100 has almost reached it topmost rotational position, but the location of the drain ports 114 is such that lubricant 106 starts to drip or drain out of the ports 114 when the ports move into a position above the chains 66, 78 and 90 and the trough 104. Thus, the size of the emitters, the size of the drain ports 114, and the position of the drain ports along the cylindrical wall 156 of the emitters are all predetermined to allow the lubricant to flow when the emitters encounter their intended target elements.

As the assembly 100 continues to rotate toward its upright position as shown in FIGS. 10a and 11a, the drain ports 114 remain below the lubricant level within the emitters 110 and 112 and the lubricant continues to drain or drip from the drain ports. Lubricant continues to flow from the drain ports 114 until the level of lubricant in the emitters is below the drain ports. Preferably substantially all of lubricant loaded into the emitters is drained from them during each complete rotation of the assembly 100, thereby delivering a constant predetermined quantity of lubricant 106 on a periodic basis. However if all of the lubricant is not drained from the emitters, it is held in the emitters as the continued rotation moves the ports 114 upward.

The lubricant which drains on to the trough 104 falls on two curved segments 170 and 172 connected by an offset bridge piece 174. The two curved segments 170 and 172 form a gap through which lubricant from the emitter 110 drains onto the third chain 90 in addition to other lubrication points such as ball bearings (not shown). The chain 90 is located below the two segments 170 and 172, so the gap between the segments 170 and 172 allows some of the lubricant from the emitter 110 to reach the chain 90 as the drain port 114 passes over the gap, as is shown in FIG. 4. Each curved segment is fixedly attached to a clamp 176, and each clamp 176 is secured to the horizontal beam 43 by bolts 178 as is shown in FIGS. 2 and 3.

The lubricant applied to the two trough segments 170 and 172 drains to the end of the curved segments where adjustable rubber cups 173 direct the lubricant into the drive chains 44a and 44c and into containers 180 and 182, respectively, as shown in FIG. 2. Each container 180 and 182 is fixedly attached to the horizontal beam 43 beneath the ends of the curved segments 170 and 172, respectively, to capture lubricant that is not carried away by the moving drive chains 44a and 44c. Roller pads 184 and 186 are rotatably attached within each of the containers 180 and 182, respectively. The roller pads 184 and 186 rotate idly through a pool of lubricant which collects in the containers and pick up and apply the lubricant to the drive chains 44a and 44c which engage the top of the roller pads 184 and 186.

Figure 12:
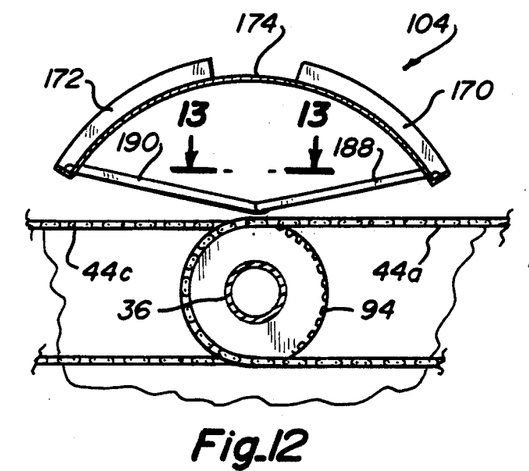
FIG. 12 is an elevational section view of certain elements of the lubrication device shown in FIG. 2 and the irrigation system shown in FIG. 1, taken substantially in the plane of line 12—12 in FIG. 3.
Figure 13:
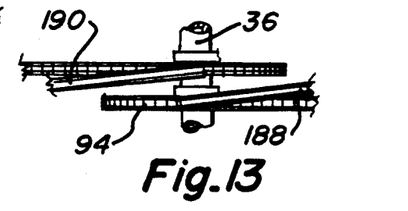
FIG. 13 is a view taken substantially in the plane of line 13—13 in FIG. 12.

As an alternative to allowing the lubricant from the trough segments 170 and 172 to drip directly onto the drive chains and into the containers, another embodiment of the lubricant distribution device uses rigid conduits 188 and 190 fixed to the ends of the trough segments 170 and 172, respectively. The conduits 188 and 190 direct the lubricant collected by each segment 170 and 172 to the drive chains 44a and 44c at the point where they engage the set 94 of drive sprockets attached to the water conduit 36, as is shown in FIGS. 12 and 13. The conduits 188 and 190 attached to the end of the segments 170 and 172 each apply lubricant to a separate drive chain 44.

Figure 14:
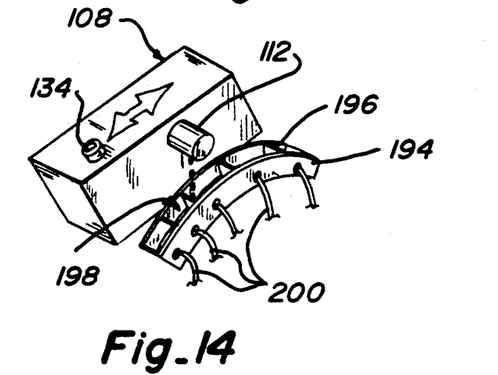
FIG. 14 is a perspective view of a lubrication distributor which is an alternative to that shown in FIG. 2.

A further embodiment of a lubricant distribution device 192 is shown in FIG. 14. The device 192 includes a curved trough 194 with dividers 196 forming a number of closed, cup-like, individual receptacle sections 198. As the emitter 112 passes over the trough 194, lubricant from the drain port 114 drains into each receptacle section 198. Tubes 200 are attached to each receptacle section 198 to direct the lubricant collected in the receptacle sections to remote points which need the application of lubrication.

To help prevent water (both precipitation and irrigation water) from contaminating the lubricant in the containers 180 and 182 (FIG. 3), or from entering the segmented receptacle sections 198 (FIG. 14), or to otherwise dilute the lubricant as it is applied to the chains, a rain cover or hood 202 is placed over the lubrication device 30 as shown in FIGS. 1, 3 and 4. The hood 202 is removable to reveal the lubrication device 30 as shown in FIG. 2. The hood 202 includes receptacles 204 which are formed in the inside of the hood 202 and which face downward, as shown in FIG. 3. Mounting tabs 206 extend upward from the clamps 176 attached to the horizontal beam 43, as shown in FIG. 2. The hood 202 is mounted over the lubrication device 30 and is held there in position by fitting the receptacles 204 down over the mounting tabs 206. Although the hood 202 offers partial protection from water and other elements falling from above, such protection is not adequate to eliminate the need for continued lubrication of the chains and other power transmission elements.

Another, alternative embodiment lubrication device 210 embodying the present invention is shown in FIGS. 15-20. The lubrication device 210 is mounted on each drive section 212 of another type of self-propelled irrigation system 214, which is shown primarily in FIGS. 15 and 16. The drive section 212 uses a front wheel 216 and a rear wheel 218 connected at opposite ends of a frame 220. An electrical motor 222 is attached to the frame 220 to provide power for rotating the wheels 216 and 218 and moving the irrigation system 214.

The motive power for moving the irrigation system 214 begins with the electrical motor 222. The motor 222 is connected to a right angle power transfer device 224, and the device 224 rotates a first small sprocket 226. The first small sprocket 226 meshes with a first chain 228 which rotates a first large sprocket 230. The size differential of the sprockets 226 and 230 achieves a first stage of speed reduction and torque increase in power transmission between the motor 222 and the wheels 216 and 218. The first large sprocket 230 is rotatably attached to the frame 220 by a shaft 232. A second small sprocket 234 is attached to the shaft 232 to rotate in unison with the first large sprocket 230. The second small sprocket 234 meshes with a second chain 236 which rotates a second large sprocket 238. The size differential of the sprockets 234 and 238 achieves a second stage of speed reduction and torque increase in power transmission between the motor 222 and the wheels 216 and 218. A set of drive sprockets 240 and 242 is fixedly attached to the second large sprocket 238 to rotate in unison with the second large sprocket 238. Separate drive chains 244a and 244b are connected to the drive sprockets 240 and 242 extend to drive sprockets 246 and 248 connected to the front and rear wheels 216 and 218, respectively.

Operation of the electric motor 222 rotates the sprockets and chains in the described manner to rotate the wheels 216 and 218 in unison to propel each individual drive section 212 forward. A water pipe 250 and sprinkler heads 252 attached to the water pipe are carried along with movement of the drive sections 212. The water from the pipe 250 is applied by the sprinklers 252 to the crops growing in the fields over which the irrigation system 214 moves. The lubrication device 210 continually applies lubricant to the chains 228, 236, 244a and 244b to maintain them in a lubricated condition in the presence of the water from the irrigation system and other natural elements.

Figure 17:
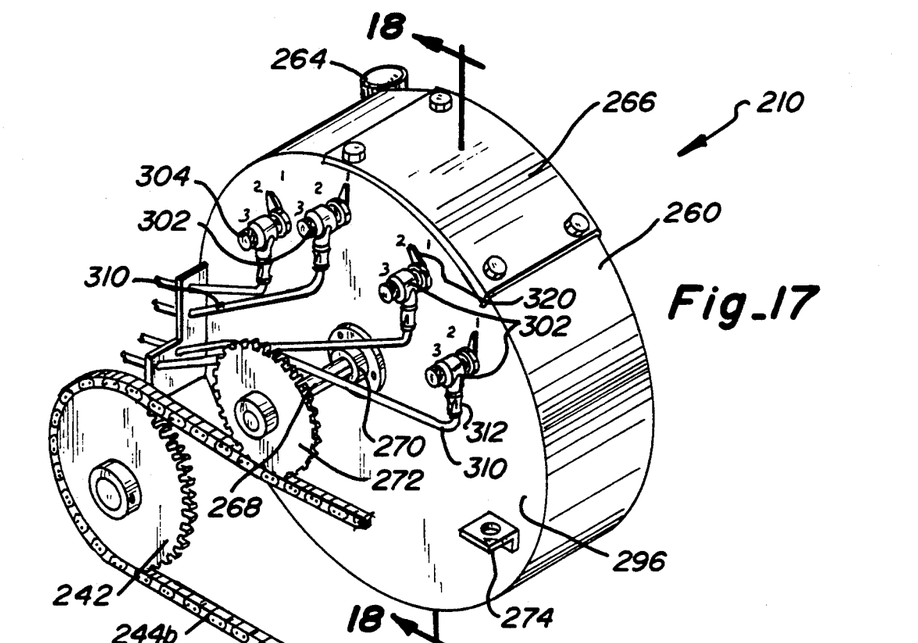
FIG. 17 is a partial perspective view of the lubrication device and a portion of the irrigation system shown in FIGS. 15 and 16.
Figure 18:
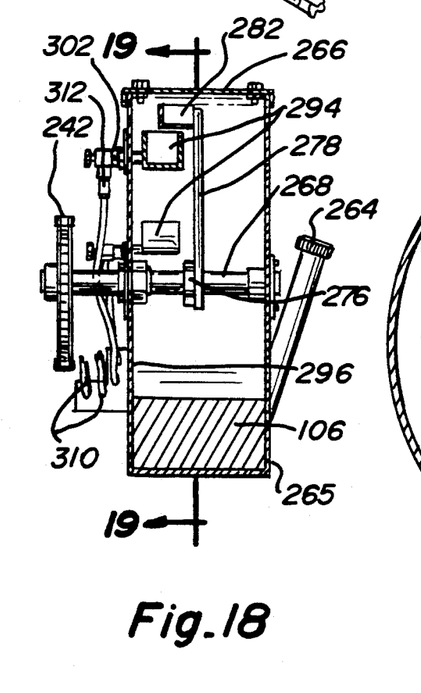
FIG. 18 is a section view taken substantially in the plane of line 18—18 in FIG. 17.
Figure 19:
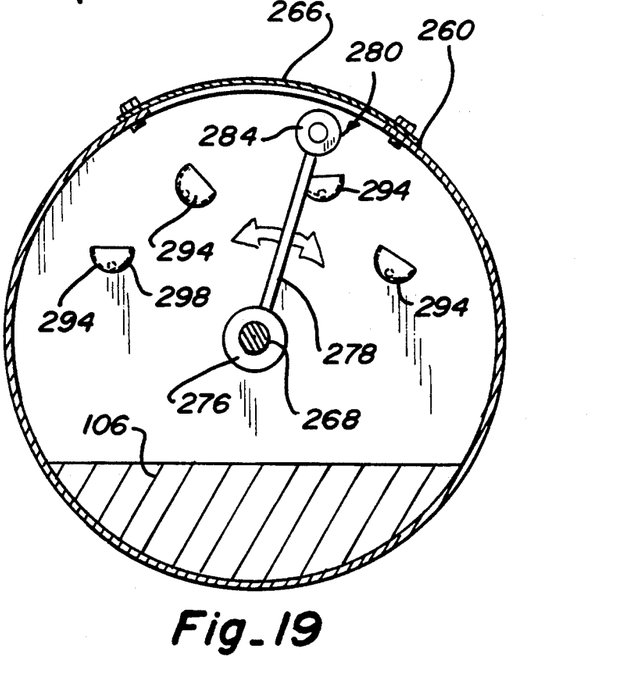
FIG. 19 is a section view taken substantially in the plane of line 19—19 in FIG. 18.

Details concerning the lubrication device 210 are shown in FIGS. 17-23. The lubrication device 210 includes an outer closed housing 260 which may be of any shape but preferably defines an internal cylindrical volume 262, as is shown in FIG. 19. The internal volume 262 defines a relatively large reservoir for containing lubricant 106 added through a fill port 264. The fill port 264 is formed in a rear wall 265 of the housing 260. A cover plate 266 is bolted or otherwise attached to the housing 260, as shown in FIGS. 17-19. The cover plate 266 allows access to the internal volume 262 and the elements of the device 210 within the internal volume, if necessary.

A cylindrical shaft 268 extends through the housing 260 and is rotatably supported by sealed bearings 270, as is shown in FIGS. 17 and 18. A sprocket 272 is attached to the shaft 268 on the exterior of the housing. The housing 260 is mounted on the frame 220 by mounting flanges 274 in a position that allows the sprocket 272 to engage a moving chain, for example the drive chain 244b. Movement of the chain 244b thus rotates the sprocket 272 and the attached shaft 268.

Figures 20, 21, 22A:
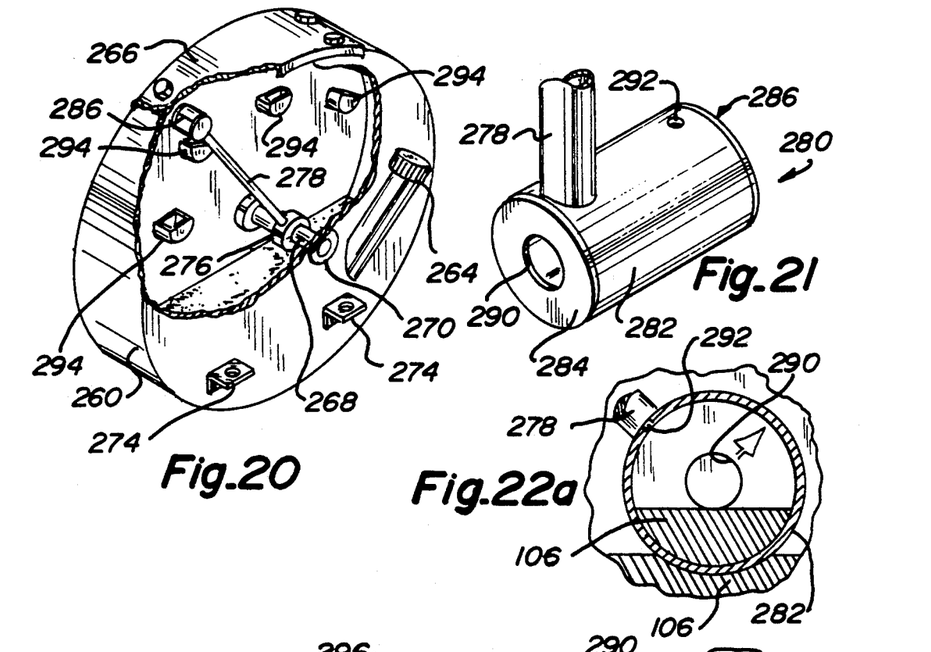
FIG. 20 is a partial perspective view the lubrication device shown in FIG. 17, with a portion broken out to reveal internal components.
FIG. 21 is an enlarged perspective view of an emitter in the lubrication device shown in FIGS. 15–20.
FIGS. 22a, 22b and 22c are generalized side section views of the emitter shown in FIG. 21, showing the condition of lubrication within the emitter at different locations of a complete rotation of the emitter.

Within the internal volume 262 of the housing 260, a sleeve 276 is fixedly attached to the shaft 268, and an elongated arm 278 is attached at a radially inner end to the sleeve 276, as is shown in FIGS. 18, 19 and 20. The other opposite radial end of the arm 278 connects to an emitter 280. The emitter 280 rotates in a circle on the end of the arm 278 within the internal volume 262 when the drive chain 244b moves and rotates the sprocket 272. Although the shaft 268 is shown as being rotated by the sprocket 272 and the chain 244b, any other type of rotational device could be used so long as its speed is consistent with the operation described below.

The emitter 280 may be of any shape, but is preferably cylindrical, as is shown in FIG. 21. The emitter 280 has an outer cylindrical wall 282, a first circular end 284 and a second circular end 286, all of which define a cylindrical internal volume 288 that is relatively smaller than the internal volume 262 of the housing 260. A circular hole 290 formed concentrically with the cylindrical wall 282 within the first end 284 forms an opening which allows lubricant 106 to fill the internal volume 288 of the emitter 280, when the emitter moves below the level of lubricant 106 within the housing, as shown in FIG. 19. Additionally, an emitter drain port 292 is formed in the cylindrical wall 282 at a point which faces toward the sleeve 276 and the shaft 268.

Individual cups 294 are attached to a front wall 296 of the housing 260 within the interior volume 262. The cups 294 are located at positions in a circular arc concentric with the shaft 268. The cups 294 are positioned below the upper portion of the path which the emitter 280 follows as it rotates within the housing 260. The cups 294 extend below the emitter 280 as it rotates through its path. Each cup 294 opens upwardly as is shown in FIGS. 19 and 20. Each cup 294 catches lubricant which drains from the drain port 292 of the emitter 280 as it moves through a circular path.

Figures 22B, 22C, 23:
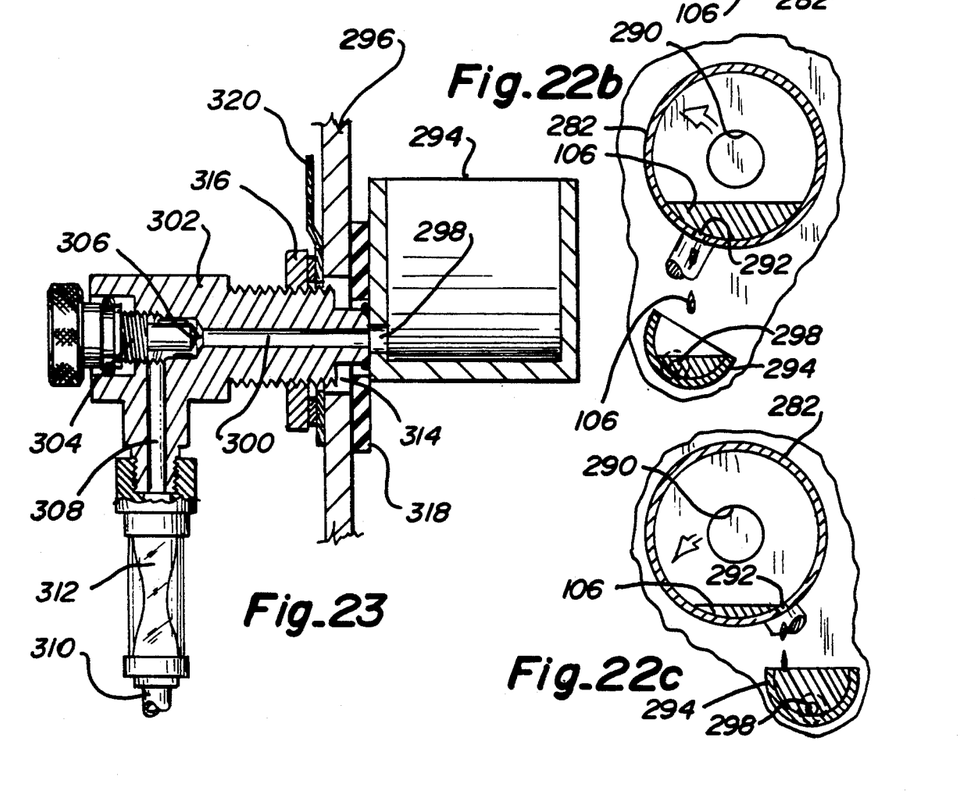
FIG. 23 is an enlarged section view of a connector body and a cup of the lubrication device shown in FIGS. 15–20.

The loading of the emitter with lubricant from within the housing and the delivery of the lubricant from the emitter occurs during different parts of each rotation of the emitter as is shown in FIGS. 22a-22c. Rotation of the sprocket 272 rotates the shaft 268, the attached arm 278, and the attached emitter 280 through a circular path within the internal volume 262 of the housing 260. When the emitter 280 rotates below the lubricant level within the internal volume 262, lubricant 106 fills the emitter 280 via the circular hole 290 in the first end 284. Upon the emitter 280 rotating above the lubricant level, excess lubricant within the internal volume 288 of the emitter 280 drains from the circular hole 290 until the lubricant level within the internal volume 288 is reduced to the level of the hole 290, as is shown in FIG. 22a.

As the emitter 280 rotates above the cups 294 at the upper portion of the circular path through which the emitter 280 travels, the drain port 292 rotates downward as shown in FIG. 22b. As the emitter 280 moves above the first of the cups 294, the lubricant drains from the drain port 292 into the cups 294. The lubricant continues to drain from the port 292 into the cups 294 as the emitter 280 rotates along the upper portion of its circular path above the cups.

The drain port 292 is sized so that the lubricant within internal volume 288 of the emitter drains from the port 292 at a metered rate that allows each of the cups to receive some of the lubricant delivered by the emitter 280. As the emitter 280 rotates past the last cup 294, as shown in FIG. 22c, the drain port 292 rotates above the level of lubricant remaining in the internal volume 288 of the emitter. In this manner the emitter loads each cup 294 with a quantity of lubricant in a meter-like manner during each rotation.

Figure 15:
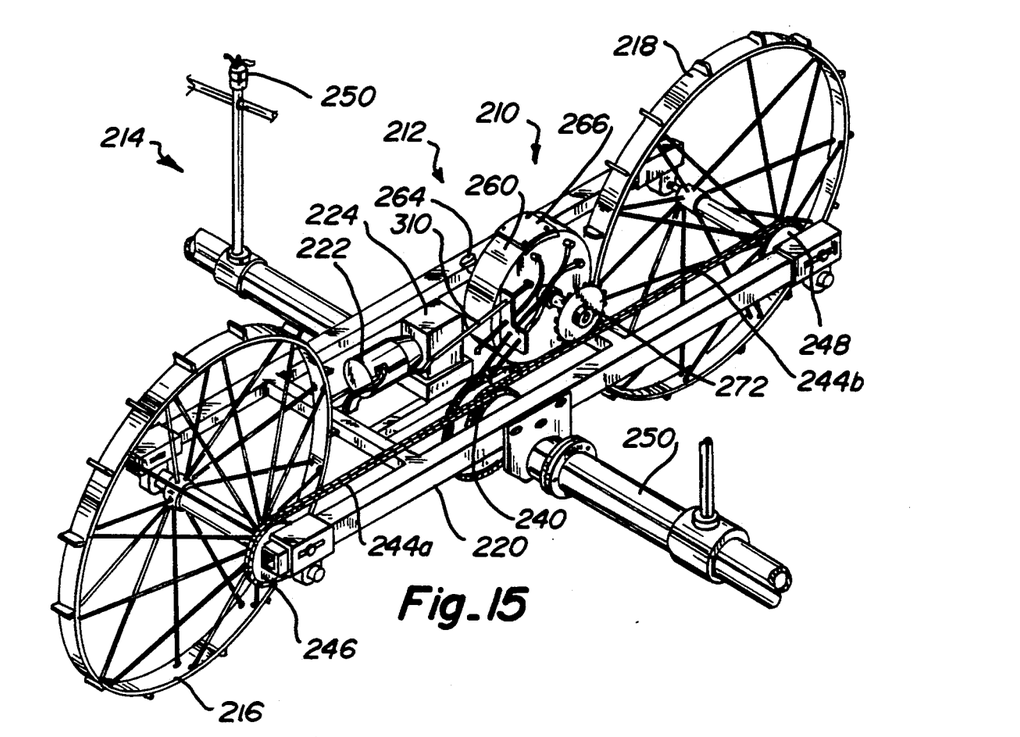
FIG. 15 is a generalized partial perspective view of another self-propelled irrigation system to which another lubrication device incorporating the present invention is attached.
Figure 16:
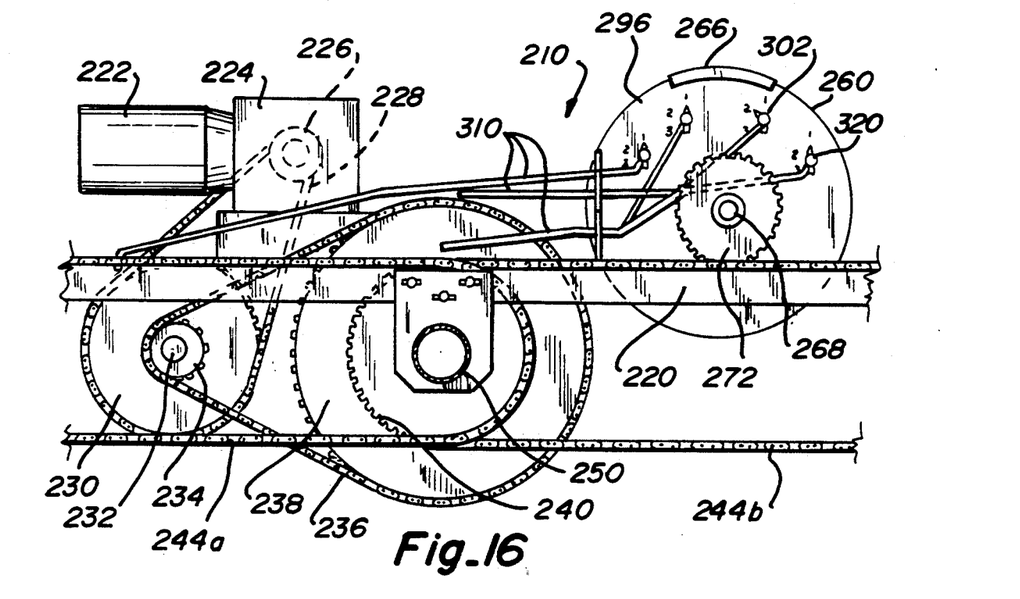
FIG. 16 is a partial side elevational view of a portion of the irrigation system shown in FIG. 15.

An exit port 298 is formed near the bottom of each cup 294, as is shown in FIG. 23. The exit port 298 communicates with an internal opening 300 formed through a connector body 302. The cups 294 are each welded to a connector body 302 as shown in FIG. 23. The opening 300 leads to a metering valve screw 304 which is threaded into the connector body 302. The position of the inner end of the metering screw 304 relative to the end of the opening 300 controls the amount of lubricant which flows from the opening 300 into an internal chamber 306 in which the inner end of the metering screw 304 is positioned. Another opening 308 extends through the connector body 302 from the chamber 306 to drain lubricant to a distribution tube 310. A sight glass 312 positioned between the opening 308 and the distribution tube 310 provides a visual indication of the amount of lubricant draining from each cup 294. Thus, once the lubricant is collected in the cups 294, the lubricant passes through the exit ports 298 and into the tubes 310 for transfer to the lubrication points on the drive section 212 or other parts of a machine. In the particular application of the drive section 212, the tubes 310 terminate at positions where the lubricant is applied to the chains 228, 236, 244a and 244b as shown in FIGS. 15 and 16.

In addition to the movement of the emitter 280, the quantity of lubricant within the emitter, the size of the drain port 292, and the metering effect of the metering screw 304 controlling the amount of lubricant delivered, the orientation of the cups 294 also has an effect, as is shown in FIG. 19. The orientation of each cup 294 may be adjusted by rotating the cup. In a rotated position in which a cup 294 faces in a direction other than straight up, the effective size of the cup is reduced, thereby reducing the amount of lubricant that the cup may collect from the emitter 280. Excess lubricant not captured by the rotated cup simply rejoins the volume of lubricant at the bottom of the housing 260.

The connector body 302 may be rotated from the exterior of the housing 260. The connector body 302 is retained within an opening 314 of the front wall 296 of the housing 260 by a jam nut 316 threadably attached to the connector body 302. When tightened, the jam nut 316 prevents rotation of the connector body 302 and the attached cup 294. A seal 318 located between the cup 294 and the interior of the front wall 296 provides a fluid tight seal which prevents the lubricant from leaking out of the housing 260 past the connector body 302. By rotating the connector body 302 at the exterior of the housing 260, the rotational position of the connected cup 294 within the housing is also adjusted. The actual rotational position of each cup 294 is indicated on the exterior of the housing 260 by an indicator handle 320 fixed to the connector body 302 adjacent the front wall 296 of the housing 260. A numerical scale printed on the front wall 296 may be used in conjunction with the indicator handle 320 as shown in FIGS. 16 and 17 to aid in the determination of the position of each cup 294.

From the previous discussion of different embodiments, the present invention applies lubricant to predetermined lubricating points on exposed moving parts of equipment. Lubricant is delivered as a result of rotation of a lubricant dispensing emitter. In the first embodiment of the lubrication device 30, the reservoir and emitter assembly 100 rotates. In the second embodiment of the lubrication device 210, the reservoir or housing 260 is stationary while the emitter 280 rotates within the fixed reservoir. In both cases, the present invention operates to apply lubricant only during operation of the machine. The lubricant is loaded into the emitter during a portion of its rotation, and the lubricant is delivered during a different portion of its rotation. Additionally, during periods in which the machine is not used, both embodiments prevent more than a limited amount of lubricant from escaping.

Presently preferred embodiments of the present invention and many of its improvements have been described with a degree of particularity. This description has been made by way of preferred example and is based on a present understanding of knowledge available regarding the invention. It should be understood, however, that the scope of the present invention is defined by following claims, and not necessarily by the detailed description of the preferred embodiment.

The invention claimed is:

1. A lubrication device for applying lubricant to a lubrication point of a machine having a rotating component, comprising:

a reservoir having an internal volume of a predetermined size to contain lubricant within the reservoir;

an emitter connected in a fluid communication path with the reservoir and having an internal volume of a predetermined size substantially smaller than the internal volume of the reservoir, the emitter having an inlet through which lubricant enters the internal volume of the emitter an da drain port to allow the lubricant to drain from the emitter;

means connected to the emitter for moving the emitter through a movement path having a first portion of a second portion;

a lubricant delivery receptacle connected in the fluid communication path between the reservoir and the emitter and which is filled with a deliverable amount of the lubricant within the reservoir during movement of the emitter through the movement path, the lubricant delivery receptacle supplying the deliverable amount of lubricant to the emitter while segregating the lubricant within the receptacle from the remaining lubricant within the reservoir as the emitter moves through the first portion of the movement path;

the inlet of the emitter allowing the lubricant to enter the emitter only during the first portion of the movement path and preventing lubricant from draining from the emitter during the second portion of the movement path;

the drain port of the emitter allowing the lubricant within the emitter to drain from the emitter substantially only during the second portion of the movement path and inhibiting lubricant from draining from the emitter during the first portion of the movement path; and the drain port located in the emitter relative to the position of the emitter during the second portion of the movement path to deliver the lubricant to the lubrication point.

2. A lubrication device as defined in claim 1, wherein the lubricant delivery receptacle is located within the reservoir, the reservoir is fixedly attached to the rotating component and the emitter is fixedly attached to the reservoir, and the emitter and the reservoir form an assembly which moves together in the movement path.

3. A lubrication device as defined in claim 1, wherein the lubricant delivery receptacle returns any lubricant not supplied to the emitter to the reservoir during the second portion of the movement path.

4. A lubrication device as defined in claim 2, wherein the reservoir includes a pair of opposite ends, and the lubricant delivery receptacle comprises a baffle positioned within the reservoir adjacent to and spaced apart from each end of the reservoir, the space between each end of the reservoir and the adjacent baffle comprising an end chamber to collect the deliverable amount of lubricant during movement of the assembly in the first portion of the movement path.

5. A lubrication device as defined in claim 4, wherein only the deliverable amount of lubricant in the lubricant delivery receptacle can be delivered to the emitter should rotation of the assembly stop while in the first portion of the movement path.

6. A lubrication device as defined in claim 4, wherein the emitter is position on an exterior of the reservoir, and the lubricant delivery receptacle further comprises:

a connecting conduit extending between the baffles and communicating with the end chambers, the connecting conduit filling with lubricant collected by an end chamber during rotation of the assembly; and a feed pipe connected to the connecting conduit and extending to the exterior of the reservoir and into the emitter, the feed pipe communicating lubricant from the connecting conduit to the emitter.

7. A lubrication device as defined in claim 6, further comprising:

a metering hole located in the end of the feed pip to control the flow of lubricant into the emitter.

8. A lubrication device as defined in claim 6, further comprising:

a second emitter attached to the reservoir in a manner substantially identical to the first aforesaid emitter, the second emitter positioned on the opposite side of the reservoir from the first emitter; and a second feed pipe attached to the connecting conduit and extending to the exterior of the reservoir and into the second emitter, the second feed pipe communicating lubricant from the connecting conduit to the second emitter.

9. A lubrication device as defined in claim 1, wherein the movement path is circular, the second portion of the movement path is an arc over an uppermost portion of the circular movement path, the drain port is located in the emitter to face downward when the emitter moves through the second portion of the circular movement path to drain lubricant from the emitter, and the drain port is located in the emitter to face upward when the emitter moves through a lowermost arc of the circular movement path to inhibit lubricant from draining from the drain port.

10. A lubrication device as defined in claim 9, further comprising:

a trough fixedly portioned below the emitter during the second portion of the movement path for distributing the lubricant drained from the emitter to a position other than a position below the emitter during the second portion of the movement path.

11. A lubrication device as defined in claim 10, wherein:

the trough includes two segments separated by a gap to allow lubricant to be applied directly from the drain port to the segments and to a lubrication point beneath the gap.

12. A lubrication device as defined in claim 10, wherein:

the trough includes a curved segment positioned beneath the emitter to collect lubricant drained from the emitter during the second portion of the movement path, and further comprising a distribution conduit connected to the end of the curved segment and extending to a lubrication point at a location other than below the emitter during movement through the second portion of the movement path.

13. A lubrication device as defined in claim 10, wherein:

the trough includes a curved segment positioned beneath the emitter to collect lubrication drained from the emitter during the second portion of the movement path, and further comprising a container located below the trough to receive the lubricant distributed by the trough, and an idler wheel located in the container and rotating through lubricant collected in the container and contacting a moving element for applying lubricant to the moving element.

14. A lubrication device as defined in claim 10, wherein:

the trough includes a plurality of individual receptacle sections separated by dividers within which to collect lubricant drained from the emitter during the second portion of the movement path, and a distribution conduit connected to each receptacle section to distribute the lubricant collected to a lubrication point at a location other than beneath the emitter during movement through the second portion of the movement path.

15. A lubrication device for applying lubricant to a lubrication point of a machine having a rotating component, comprising:

a closed reservoir fixedly attached in a stationary position to the machine, the reservoir having an internal volume of a predetermined size to contain lubricant within the reservoir;

an emitter positioned within the reservoir and having an internal volume of a predetermined size substantially smaller than the internal volume of the reservoir, the emitter having an inlet through which lubricant enters the internal volume of the emitter and a drain port to allow the lubricant to drain from the emitter;

means connected to the emitter within the reservoir for moving the emitter in a first portion of a movement path into fluid communication with the lubricant in the reservoir and in a second portion of the movement path out of fluid communication with the lubricant in the reservoir;

the inlet of the emitter allowing the lubricant to enter the emitter only during the first portion of the movement path and preventing lubricant from draining from the emitter during the second portion of the movement path;

the drain port of the emitter allowing the lubricant within the emitter to drain from the emitter substantially only during the second portion of the movement path and inhibiting lubricant from draining from the emitter during the first portion of the movement path; and the drain port located in the emitter relative to the position of the emitter during the second portion of the movement path to deliver the lubricant to the lubrication point.

16. A lubrication device as defined in claim 15, wherein the means for moving the emitter within the reservoir comprises:

a shaft rotatably positioned within the reservoir; and an elongated arm attached at one end to the shaft and attached at a second opposite end to the emitter, the arm and the emitter rotating in a circular movement path within the reservoir.

17. A lubrication device as defined in claim 16, wherein the first portion of the circular movement path positions the emitter at a location to be immersed in lubricant within the reservoir; and further comprising:

at least one cup positioned within the reservoir at a location beneath the emitter in the second portion of the circular movement path, the cup receiving the lubricant drained from the drain port of the emitter; and a tube connected to the cup for distributing the lubricant collected in the cup to a lubrication point exterior of the reservoir.

18. A lubrication device as defined in claim 17, wherein a plurality of cups are positioned within the reservoir, and a tube connected each cup to a lubrication point.

19. A lubrication device as defined in claim 17, wherein the orientation of the cup within the reservoir is adjustable from the exterior of the reservoir.

20. A lubrication device as defined in claim 17, wherein the shaft extends to the exterior of the reservoir, and further comprising means connecting the shaft to the rotating component at the exterior of the reservoir for rotating the shaft.

21. A method of applying lubricant to a lubrication point of a machine having a rotating component, comprising the steps of:

containing lubricant within a reservoir having an internal volume of a predetermined size;

utilizing an emitter having an internal volume of a predetermined size substantially smaller than the internal volume of the reservoir, the emitter having an inlet through which lubricant enters the internal volume of the emitter and a drain port to allow the lubricant to drain from the emitter;

rotating the emitter in a circular movement path, the circular movement path having a first portion and a second portion;

filling a lubricant delivery receptacle with a deliverable amount of the lubricant within the reservoir during movement of the emitter through the circular movement path;

segregating the lubricant within the receptacle from the remaining lubricant within the reservoir during the first portion of the movement path;

flowing lubricant from the lubricant delivery receptacle into the emitter through the inlet while the emitter is in the first portion of the circular movement path;

draining lubricant from the internal volume of the emitter through the drain port while the emitter is in the second portion of the circular movement path; and delivering the lubricant drained from the emitter to the lubrication point.

22. A method as defined in claim 21, further comprising the step of:

returning any portion of the deliverable amount of the lubricant not supplied to the emitter from the lubricant delivery receptacle to the reservoir during the second portion of the movement path.

23. A method as defined in claim 21, further comprising the steps of:

fixedly attaching a distribution device to the machine and positioning the distribution device below the emitter drain port during the second portion of the movement path;

collecting the lubricant drained from the emitter within the distribution device; and distributing the collected lubricant to a position other than a position directly below the drain port.

24. A method of applying lubricant to a lubrication point of a machine having a rotating component, comprising the steps of:

containing lubricant within a reservoir having an internal volume of a predetermined size;

stationarily positioning the reservoir on the machine;

utilizing an emitter having an internal volume of a predetermined size substantially smaller than the internal volume of the reservoir, the emitter having an inlet through which lubricant enters the internal volume of the emitter and a drain port to allow the lubricant to drain from the emitter;

rotating the emitter through a circular movement path within the reservoir, the circular movement path having a first portion and a second portion;

flowing lubricant from the reservoir into the emitter through the inlet while the emitter is in the first portion of the circular movement path;

draining lubricant from the internal volume of the emitter through the drain port while the emitter is in the second portion of the circular movement path; and delivering the lubricant drained from the emitter to the lubrication point.

25. A method as defined in claim 24, further comprising the steps of:

positioning at least one cup within the reservoir at a location beneath the emitter in the second portion of the circular movement path;

collecting the lubricant drained from the emitter in the cup; and distributing the lubricant collected in the cup to a lubrication point exterior of the reservoir.

* * * * *